(12) United States Patent
Kim

(10) Patent No.: US 11,978,843 B2
(45) Date of Patent: May 7, 2024

(54) METHOD OF MANUFACTURING RECHARGEABLE BATTERY POUCH, APPARATUS FOR MANUFACTURING THE SAME, AND RECHARGEABLE BATTERY MANUFACTURED THEREBY

(71) Applicant: SK INNOVATION CO., LTD., Seoul (KR)

(72) Inventor: Wook Kyoung Kim, Daejeon (KR)

(73) Assignee: SK ON CO., LTD., Seoul (KR)

( * ) Notice: Subject to any disclaimer, the term of this patent is extended or adjusted under 35 U.S.C. 154(b) by 52 days.

(21) Appl. No.: 17/568,243

(22) Filed: Jan. 4, 2022

(65) Prior Publication Data

US 2022/0216500 A1    Jul. 7, 2022

(30) Foreign Application Priority Data

Jan. 5, 2021   (KR) .......................... 10-2021-0000950

(51) Int. Cl.
*H01M 10/04* (2006.01)
*H01M 50/105* (2021.01)
*H01M 50/107* (2021.01)

(52) U.S. Cl.
CPC ... *H01M 10/0404* (2013.01); *H01M 10/0409* (2013.01); *H01M 50/105* (2021.01); *H01M 50/107* (2021.01)

(58) Field of Classification Search
CPC .......... H01M 10/0404; H01M 50/105; H01M 50/107; H01M 10/0409
See application file for complete search history.

(56) References Cited

U.S. PATENT DOCUMENTS

| | | | | |
|---|---|---|---|---|
| 2019/0312237 A1* | 10/2019 | Moon | .................... | H01M 10/52 |
| 2020/0331187 A1* | 10/2020 | Suh | .................... | H01M 10/0436 |
| 2021/0098753 A1* | 4/2021 | Kang | .................. | H01M 50/531 |
| 2022/0006114 A1* | 1/2022 | Bae | ....................... | H01M 50/533 |
| 2023/0017233 A1* | 1/2023 | Byun | .................. | H01M 10/049 |

FOREIGN PATENT DOCUMENTS

| | | |
|---|---|---|
| EP | 3321991 A1 | 5/2018 |
| EP | 3561899 A1 | 10/2019 |
| EP | 3836283 A3 | 8/2021 |
| JP | 2006-134604 A | 5/2006 |
| KR | 10-2017-0109327 A | 9/2017 |
| KR | 10-1820443 B1 | 1/2018 |

OTHER PUBLICATIONS

Extended European Search Report for the European Patent Application No. 22150085.3 issued by the European Patent Office dated May 24, 2022.

* cited by examiner

*Primary Examiner* — Jeremiah R Smith
(74) *Attorney, Agent, or Firm* — IP & T GROUP LLP

(57) ABSTRACT

A method of manufacturing a rechargeable battery pouch having three sealed sides, an apparatus for manufacturing the same, and a rechargeable battery manufactured thereby in which a pouch film may be bent, and an uneven portion may then be formed in a bent portion by using a bending knife, thereby reducing a gap between a lower end of the pouch film and an electrode assembly when the electrode assembly is accommodated in the pouch film. In this manner, it is possible to reduce a size of a bat-ear shaped fold to increase a contact area between the battery pouch and a cooling plate, and improve a space efficiency of the rechargeable battery.

4 Claims, 6 Drawing Sheets

CONVENTIONAL ART

METHOD OF MANUFACTURING RECHARGEABLE BATTERY POUCH, APPARATUS FOR MANUFACTURING THE SAME, AND RECHARGEABLE BATTERY MANUFACTURED THEREBY

CROSS-REFERENCE TO RELATED APPLICATIONS

This application claims priority under 35 U.S.C. § 119 to Korean Patent Application No. 10-2021-0000950, filed on Jan. 5, 2021, in the Korean Intellectual Property Office, the disclosure of which is incorporated herein by reference in its entirety.

TECHNICAL FIELD

The following disclosure relates to a method of manufacturing a rechargeable battery pouch, an apparatus for manufacturing the same, and a rechargeable battery manufactured thereby, and more particularly, to a method of manufacturing a rechargeable battery pouch having three sealed sides, an apparatus for manufacturing the same, and a rechargeable battery manufactured thereby.

BACKGROUND

A battery cell of a rechargeable battery may be an electrode assembly including a positive electrode, a negative electrode, a separator and an electrolyte and the battery cell may be wrapped with an exterior material. The electrode assembly may be classified into: a jelly-roll type in which a separator is interposed between sheet-type positive and negative electrodes, coated with an active material; and a stack-folding type in which stack-type unit cells, sequentially stacked on each other in a state where the separator is interposed between the plurality of positive and negative electrodes, are wound by a long-length separator film.

The exterior material surrounding this electrode assembly may be packaged and used in a shape of a container formed into a cylinder or a cuboid by press-processing a metal material, or a pouch made of a multi-layer film formed by extruding a polymer material. Among these two types, the pouch-type battery has been widely used in various fields based on its low manufacturing cost, low weight and high formability.

In recent years, the pouch-type rechargeable battery may be manufactured in such a manner that three sides of the electrode assembly are sealed by a pouch and at least one side of the electrode assembly is in direct contact with a cooling plate. This manufacturing manner is intended to cool the rechargeable battery, thereby increasing its energy efficiency. However, when the three sides of the rechargeable battery are sealed by the pouch, the battery cell may not be effectively cooled because the battery may have a bat-ear shaped fold occurring by interferences of wrapped portions in a process of sealing the three sides of the battery, an interference with an adjacent battery cell and/or a disturbed contact with the cooling plate.

To address this concern in the past, performed is a process of forming the battery pouch in a certain shape to minimize the bat-ear shaped fold occurring in a center of the conventional rechargeable battery pouch. However, when manufacturing the conventional rechargeable battery pouch, the pouch may be rolled in because an elastic force accumulated in the process of forming the pouch may push the pouch upward towards the electrode assembly in the process of sealing the three sides of the rechargeable battery. In this case, the pouch may occupy a space supposed to accommodate the electrode assembly and the electrode assembly may thus have a relatively small size, which may lower energy density of the rechargeable battery. In addition, a contact area between the battery pouch and the cooling plate may be reduced due to the protruding bat-ear shaped fold, which may reduce energy efficiency of the rechargeable battery.

SUMMARY

One exemplary embodiment of the present disclosure is directed to providing a method of manufacturing a rechargeable battery pouch, which may suppress a bat-ear shaped fold occurring in the pouch surrounding an electrode assembly while the rechargeable battery is manufactured by using a three-side sealing method in which three edges of a folded together polymer sheet are sealed to encapsulate an electrode assembly the battery.

Another exemplary embodiment of the present disclosure is directed to providing an apparatus for manufacturing a rechargeable battery pouch, which may suppress a bat-ear shaped fold occurring therein and a rechargeable battery manufactured thereby to have a minimal bat-ear shaped fold.

In one general aspect, a method of manufacturing a rechargeable battery pouch includes: forming a pouch by forming a space for accommodating an electrode assembly in a pouch film; preparing a bending die used to form a bent portion in the pouch film in a direction opposite to a direction in which the pouch film is folded over in order for the pouch film to accommodate the electrode assembly; disposing the pouch film on top of the bending die; bending the pouch film by pushing down both sides of the pouch film along each side of the bending die while the pouch film is disposed on the top of the bending die; forming an uneven portion in the bent portion by pressing the bent portion, formed by the bending of the pouch film, by using a bending knife pressing into the bent portion; disposing the electrode assembly against the uneven portion of the pouch film, and folding opposing both ends of the pouch film over the electrode assembly for the space for accommodating the electrode assembly in the pouch film; and sealing together at least the folded opposing ends of the pouch film.

The bending die may include an edge having a predetermined angle for the pouch film to be bent, and a recess may be included in the edge of the bending die.

A protrusion corresponding to the recess of the bending die may be formed at one end of the bending knife, and when the bent portion of the pouch film is pressed by the protrusion of the bending knife in the forming of the uneven portion, the protrusion of the bending knife may be accommodated in the recess of the bending die, thereby forming the uneven portion in the pouch film.

The bending die may have two or more recesses, and the bending knife may have two or more protrusions corresponding to the two or more recesses of the bending die.

An apparatus for manufacturing a rechargeable battery pouch manufactured by using the method as described above includes a bending die including a) an edge having a predetermined angle for a pouch film to be bent and b) a recess formed in the edge of the bending die.

A protrusion corresponding to the recess of the bending die may be formed at one end of a bending knife, and the protrusion of the bending knife may be accommodated in a bent portion of the pouch film, thereby forming an uneven portion in the pouch film.

The bending die may have two or more recesses, and the bending knife may have two or more protrusions corresponding to the two or more recesses of the bending die.

There is provided a rechargeable battery manufactured by using the method as described above, wherein the rechargeable battery pouch has three sides sealed and one side bent, and the bent portion in as a first waveform is formed on the bent one side, and the uneven portion has a second waveform of a shorter length than that of the first waveform of the bent portion is formed in a center of the bent portion.

The uneven portion formed in a center of the bent portion may have two or more waveforms.

DETAILED DESCRIPTION OF EMBODIMENTS

Hereinafter, various technical aspects of the present disclosure will be described in more detail with reference to the accompanying drawings. The accompanying drawings are only examples illustrated in order to describe the technical aspects of the present disclosure in more detail. Therefore, the present disclosure is not limited to forms of the accompanying drawings.

It should be interpreted that terms defined by a generally used dictionary have the same meanings as the meanings in the context of the related art, and these terms should not be interpreted otherwise unless the context clearly dictates. It is to be understood that when one element is referred to as being "connected to" or "coupled to" another element, it may be connected directly to or coupled directly to another element or be connected to or coupled to another element, having another element intervening therebetween.

Figure 1:
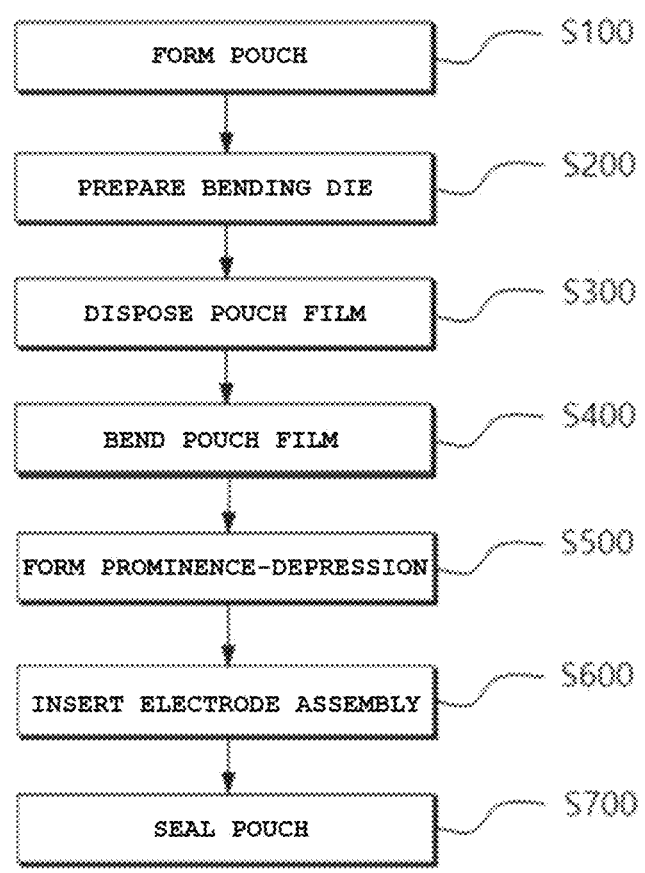
FIG. 1 is a flowchart showing a method of manufacturing a rechargeable battery pouch according to one embodiment of the present disclosure.
Figure 2:
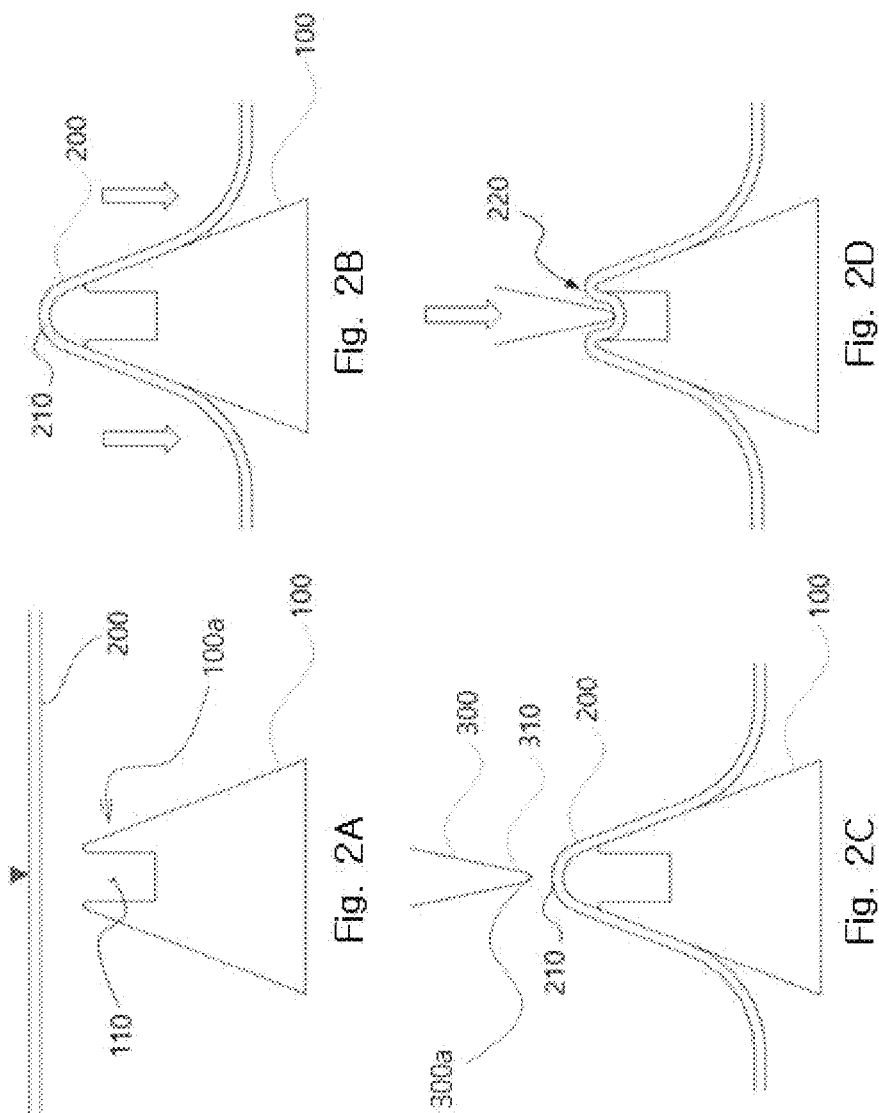
FIGS. 2A to 2D are conceptual diagrams each schematically showing various operations of the method of manufacturing the rechargeable battery pouch of the present disclosure.

FIG. 1 is a flowchart showing a method of manufacturing a rechargeable battery pouch according to one embodiment of the present disclosure. Referring to FIG. 1, the method of manufacturing a rechargeable battery pouch of the present disclosure includes: forming a pouch (S100); preparing a bending die (S200); disposing a pouch film (S300); bending the pouch film (S400); forming an uneven portion (S500); inserting an electrode assembly (S600); and sealing the pouch (S700).

The forming of the pouch (S100) is an operation of forming the pouch which forms a space in a pouch film for accommodating an electrode assembly 10. The inside of the pouch may be formed to be concave in a shape to match an outer shape of the electrode assembly 10 in this operation. The formed pouch may have a shape allowing the electrode assembly 10 to be accommodated when the pouch film is folded after inserting of the electrode assembly (S600) (which is to be performed as a subsequent operation), and pouch film 200 may be included in both of an exemplary embodiment in which an individual-type pouch film 200 is disposed and in another exemplary embodiment in which a continuous-type pouch film 200 is disposed during a roll-to-roll process of the pouch film 200. The pouch film is a strip of film that covers an electrode assembly when the electrode assembly is inserted against the pouch film and then the film is folded over forming a space inside to accommodate an electrode assembly.

The preparing of the bending die (S200) is an operation of preparing a bending die 100 used to bend the pouch film 200 for accommodating the electrode assembly 10. The bending die 100 of the present disclosure may include an edge 100a having a predetermined angle for the pouch film 200 to be bent, and here, a recess 110 may be included in the edge 100a of the bending die 100. In the operation S200, the pouch film 200 may be bent to have a bent portion 210 in a direction opposite to a direction in which the pouch film 200 is folded to accommodate the electrode assembly 10. According to one embodiment of the present disclosure, when the bent portion 210 is formed on the pouch film 200 in this way, the pouch film 200 may not be pushed upwards when the electrode assembly is accommodated or otherwise inserted against the pouch film 200, and in one embodiment, the pouch film (as shown in the lower drawing of FIG. 3) may be folded at an approximately right angle to fit an edge 10a of the electrode assembly 10.

Referring to FIGS. 2A to 2D, the bending die 100 of the present disclosure according to one exemplary embodiment may have an edge 100a formed by making a cross section of a portion where the pouch film 200 is to be folded narrow for the pouch film 200 to be bent at a predetermined angle. Here, the recess 110 may be formed in the edge 100a, and an end 300a of a bending knife 300 may thus be accommodated or otherwise pushed in the recess 110 in a subsequent operation, thereby making the pouch film 200 bent. The bending die 100 is not limited to the shape of this exemplary embodiment described with reference to FIG. 2, and may have any of various shapes as long as the pouch film 200 may be bent at a predetermined angle.

The disposing of the pouch film (S300) is an operation of disposing the formed pouch film 200 on top of the bending die 100, and a portion of the pouch film 200, to be bent, may be disposed on the top of the recess 110 of the bending die 100. The portion to be bent is marked by an arrow in FIG. 2A, and this arrow mark of the bent portion may be made in the forming of the pouch (S100) which occurred in a previous operation.

The bending of the pouch film (S400) is an operation of bending the pouch film 200 disposed on the top of the bending die 100. As shown in FIG. 2B, when both sides of the pouch film 200 are pushed down while the pouch film 200 is disposed on the top of the bending die 100, the pouch film 200 may be bent along each side of the bending die 100, and the bent portion 210 in a shape of a rising peak may be formed on a center of the bent pouch film 200. The pouch film (shown in FIG. 2C) extends into the page of the drawing far enough to cover a lateral width of electrode assembly 10.

The forming of the uneven portion (S500) is an operation of forming the uneven part in the bent portion 210 of the pouch film 200, formed in the bending of the pouch film (S400) which occurred in the previous operation. As shown in FIGS. 2C and 2D, the recess 110 is included in the upper edge of the bending die 100, and a protrusion 310 corresponding to the recess 110 exists at one end of the bending knife 300. Therefore, an uneven portion 220, i.e. uneven part formed in the bent portion 210 of the pouch film 200, may be formed as the protrusion 310 of the bending knife 300 is accommodated in the recess 110 of the bending die 100.

Figure 3:
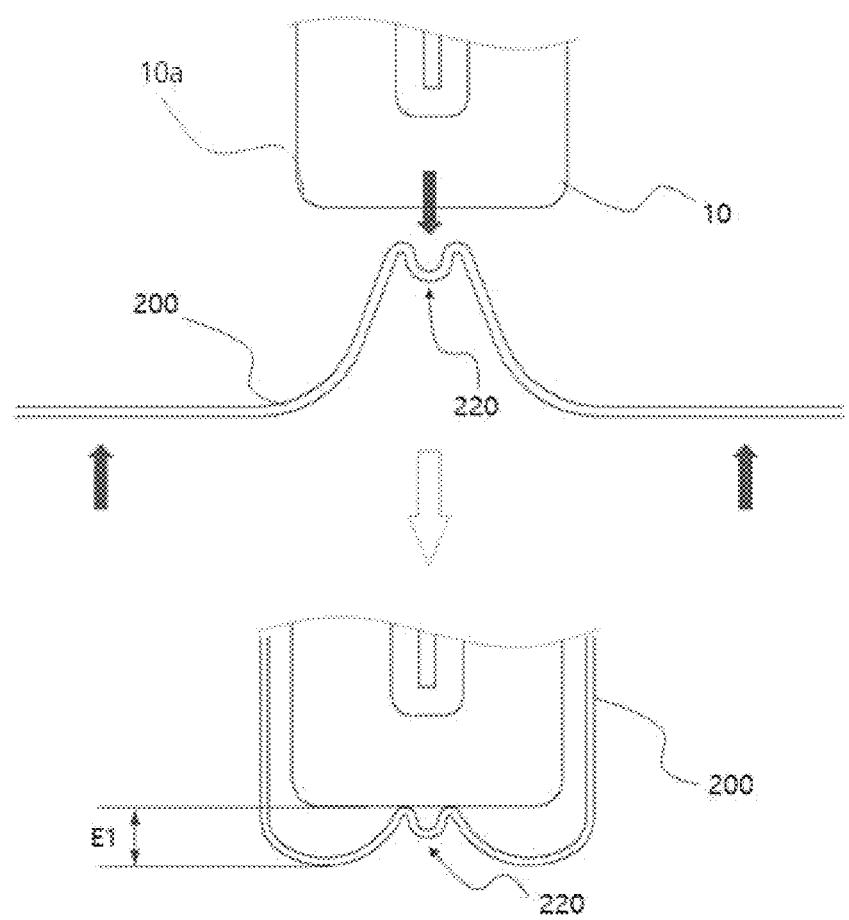
FIG. 3 is a conceptual diagram schematically showing the inserting of an electrode assembly of the present disclosure against a pouch sheet with the pouch sheet folder to form a pouch.

The inserting of the electrode assembly (S600) is an operation of disposing the electrode assembly 10 against the pouch film 200 having the uneven portion 220 in its center, and bending both ends of the pouch film 200 as shown in the lower drawing of FIG. 3 in order for the electrode assembly 10 to be accommodated in the pouch film 200.

Finally, the sealing of the pouch (S700) is an operation of sealing the ends of the pouch film 200, that is the three sides of the folded pouch film 200 (other than its side where the uneven portion 220 is formed) may be sealed together to manufacture a rechargeable battery 1000.

FIGS. 2A to 2D are conceptual diagrams each schematically showing various operations of the method of manufacturing the rechargeable battery pouch of the present disclosure, and the method of manufacturing the rechargeable battery pouch of the present disclosure is described in more detail below with reference to FIGS. 2A to 2D. FIG. 2A shows the disposing of the pouch film (S300), and shows that the portion of the pouch film 200, to be bent, may be aligned with the recess 110 of the bending die 100.

FIG. 2B shows the being of the pouch film (S400), and when both the sides of the pouch film 200 are pushed down, the pouch film 200 may be bent along each side of the bending die 100, and the bent portion 210 in the shape of a rising peak may be formed on the center of the pouch film 200, as shown in the drawing.

FIGS. 2C and 2D show the forming of the uneven portion (S500). When the bent portion 210 in the shape of the rising peak is pressed by the protrusion 310 of the bending knife 300, the center of the pouch film 200, pressed by the bending knife 300, may be depressed because the recess 110 is included in the upper edge of the bending die 100, and the depressed center may become the uneven portion 220. Here, the uneven portion 220 may have a waveform smaller than that of the bent portion 210.

FIG. 3 is a conceptual diagram schematically showing the inserting of the electrode assembly (S600) of the present disclosure. As shown in an upper drawing of FIG. 3, the pouch film 200 of the present disclosure may have a shape convex upward and the uneven portion 220 formed in its upper portion after the forming of the uneven portion (S500), and as shown in a lower drawing of FIG. 3, when both the ends of the pouch film 200 are rolled up (to fold over and surround the electrode assembly 10) in a state where the electrode assembly is aligned with the uneven portion 220, the electrode assembly 10 may be accommodated in the pouch film 200. Here, a predetermined gap E1 may be formed between a lower end of the bent pouch film 200 and the electrode assembly 10. The method of manufacturing the rechargeable battery pouch of the present disclosure may allow the gap E1, formed in a portion where the pouch film 200 is in contact with the electrode assembly 10, to have a reduced size as the uneven portion 220 is formed in the pouch film 200, thereby reducing a size of a bat-ear shaped fold as compared to a conventional manufacturing method.

Figure 4:
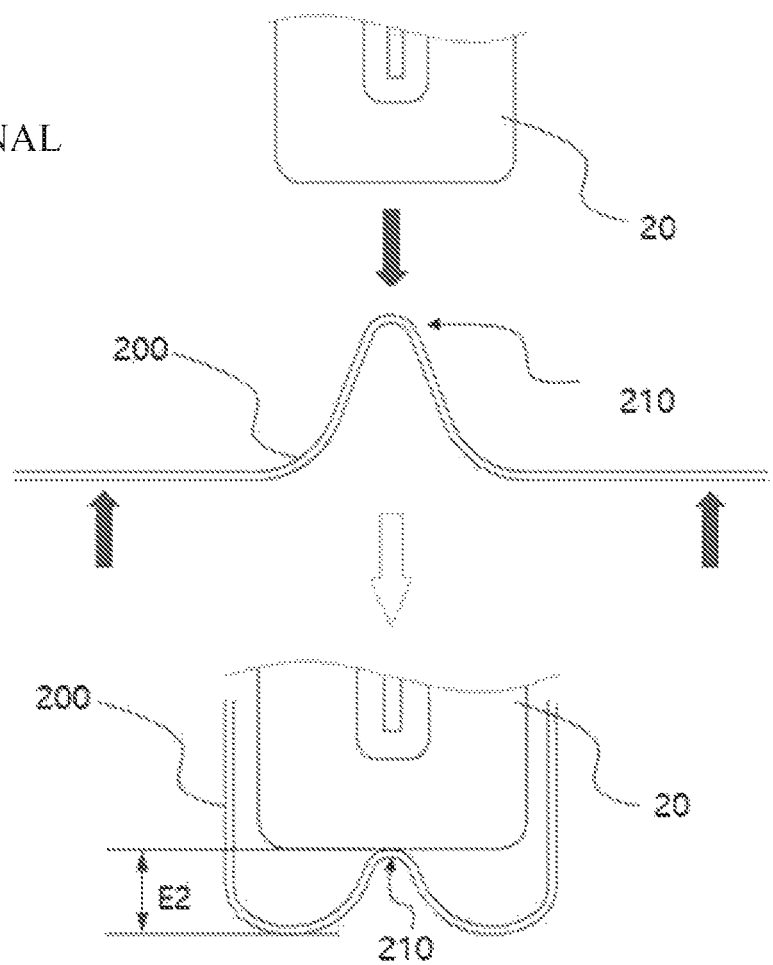
FIG. 4 is a conceptual diagram schematically showing the conventional inserting of the electrode assembly.

FIG. 4 is a conceptual diagram schematically showing the conventional inserting of the electrode assembly (S600), and according to the conventional manufacturing method, only the bent portion 210 having the shape convex upward may be formed on the bent pouch film 200. For this reason, when the electrode assembly 10 is disposed against the pouch film 200, and both opposing ends of the pouch film 200 are then rolled up (folded together) to accommodate the electrode assembly 10 in a space in the pouch film 200, a gap E2 is formed between the lower end of the pouch film 200 and the electrode assembly 10 which is inevitably larger than the gap E1 formed when the uneven portion 220 is formed in the pouch film 200 according to the present disclosure. When the gap between the lower end of the pouch film 200 and the electrode assembly 10 is increased, an unnecessary space may be formed in the pouch, resulting in reduced space efficiency. In addition, as the size of the bat-ear shaped fold is increased, the contact area between the battery pouch and the cooling plate or the like is decreased, which may impair a cooling effect.

Figure 5A:
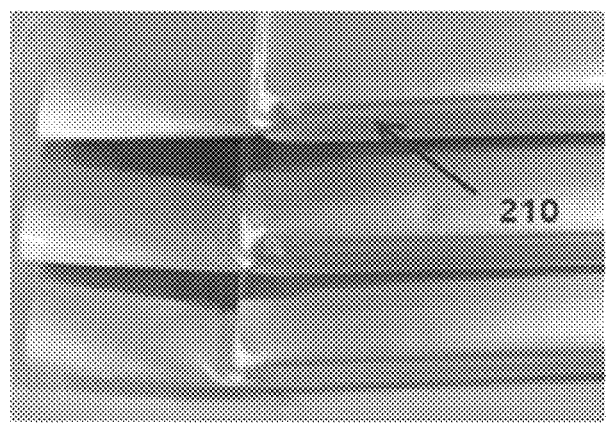
FIG. 5A is a photograph of a rechargeable battery manufactured by a conventional method of manufacturing a rechargeable battery pouch.
Figure 5B:
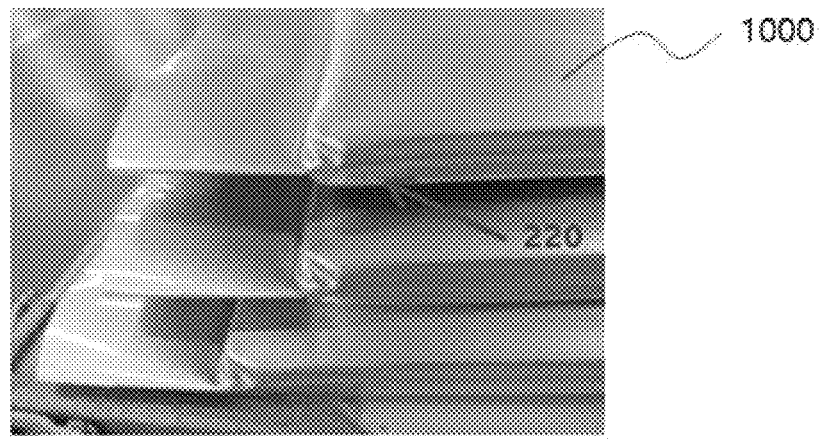
FIG. 5B is a photograph of a rechargeable battery manufactured by the method of manufacturing a rechargeable battery pouch of the present disclosure.

FIG. 5A is a photograph of a rechargeable battery manufactured by the conventional method of manufacturing a rechargeable battery pouch; and FIG. 5B is a photograph of a rechargeable battery manufactured by the method of manufacturing the rechargeable battery pouch of the present disclosure. FIG. 5A shows that: the bent portion 210 is formed on the portion marked by the arrow, the rechargeable battery pouch is deeply recessed, and the bat-ear shaped fold is large. On the contrary, FIG. 5B shows that: the uneven portion 220 is formed in the portion marked by the arrow, the rechargeable battery pouch is slightly recessed, and the bat-ear shaped fold is small. That is, when using the method of manufacturing the rechargeable battery pouch of the present disclosure, the uneven portion 220 may be formed in the bent portion 210 by using the bending knife 300, thereby reducing a size of the bat-ear shaped fold and increasing the contact area between a bottom surface of the battery pouch and the cooling plate.

Figure 6B:
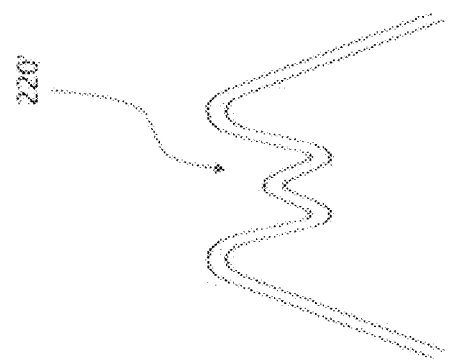
FIGS. 6A and 6B are conceptual diagrams each schematically showing the forming of an uneven portion according to another exemplary embodiment of the present disclosure.
Figure 6A:
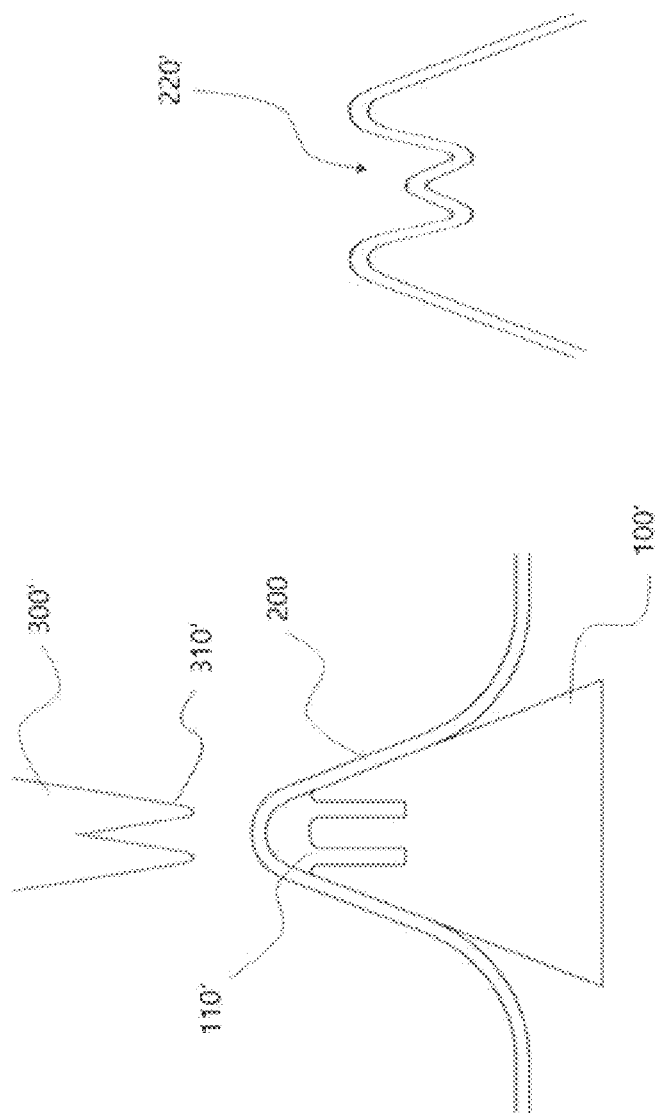

FIGS. 6A and 6B each show another exemplary embodiment of the present disclosure. Referring to FIG. 6A, two recesses 110' may be formed in a bending die 100', and two protrusions 310' corresponding thereto may be included on a bending knife 300'. When the pouch film 200 is disposed on the bending die 100' where the two recesses 110' are included as described above, and then pressed by the bending knife 300' having the two protrusions 310', an uneven portion 220' having two prominences and two depressions may be formed in the bent portion 210 of the pouch film 200 as shown in FIG. 6B. When the electrode assembly 10 is disposed on the uneven portion 220' having the two prominences and two depressions in the inserting of the electrode assembly 10, and both the ends of the pouch film 200 are then rolled up. It is possible to further reduce the size of the gap between the lower end of the pouch film 200 and the electrode assembly 10, and to have two or more recesses 100 and 110' and two or more protrusions, if necessary.

As described above, according to the method of manufacturing the rechargeable battery pouch of the present disclosure, the pouch film 200 may be bent, and the uneven portions 220 and/or 220' may then be formed in the bent portion 210 by using the bending knives 300 and/or 300', thereby reducing the gap between the lower end of the pouch film 200 and the electrode assembly 10 when the electrode assembly 10 is accommodated in the pouch film 200. In this manner, it is possible to reduce the size of the bat-ear shaped fold to increase the contact area between the battery pouch and the cooling plate, and improve the space efficiency of the rechargeable battery.

As set forth above, according to the present disclosure, the pouch film may be bent, and the uneven portion may then be formed in the bent portion by using the bending knife, thereby reducing the gap between the lower end of the pouch film and the electrode assembly when the electrode assembly is accommodated in the pouch film. In this manner, it is possible to reduce the size of the bat-ear shaped fold to increase the contact area between the battery pouch and the cooling plate, and improve the space efficiency of the rechargeable battery.

Further, the apparatus for manufacturing the rechargeable battery pouch of the present disclosure may easily form the uneven portion in the bent portion of the pouch film by using the bending die having the recess and the bending knife disposed corresponding to the recess of the bending die to allow the pouch film to have the bent portion. In this manner, it is possible to manufacture the rechargeable battery having improved cooling performance and space efficiency.

Furthermore, the rechargeable battery of the present disclosure may have the uneven portion formed in the portion where the bent portion of the pouch film is in contact with the electrode assembly, thereby reducing the size of the bat-ear shaped fold to increase the contact area between the battery pouch and the cooling plate, and improve the energy density.

The present disclosure is not limited to the abovementioned exemplary embodiments, but may be variously applied, and may be variously modified without departing from the gist of the present disclosure claimed in the claims.

What is claimed is:

1. A method of manufacturing a rechargeable battery pouch, the method comprising:
    forming a pouch by forming a space for accommodating an electrode assembly in a pouch film;
    providing a bending die used to form a bent portion on the pouch film;
    disposing the pouch film on top of the bending die;
    bending the pouch film to form the bent portion by pushing down both sides of the pouch film along each side of the bending die while the pouch film is disposed on the top of the bending die;
    after bending the pouch film to form the bent portion, forming an uneven portion in the bent portion by pressing a bending knife toward a center of the bent portion;
    disposing the electrode assembly against the uneven portion of the pouch film, and folding opposing ends of the pouch film over the electrode assembly to form a space for accommodating the electrode assembly in the pouch film; and
    sealing together at least the folded opposing ends of the pouch film.

2. The method of claim 1, wherein the bending die includes an edge having a predetermined angle for the pouch film to be bent, and a recess is included in the edge of the bending die.

3. The method of claim 2, wherein a protrusion corresponding to the recess of the bending die is formed at one end of the bending knife, and
    when the bent portion of the pouch film is pressed by the protrusion of the bending knife in the forming of the uneven portion, the protrusion of the bending knife is accommodated in the recess of the bending die, thereby forming the uneven portion in the pouch film.

4. The method of claim 3, wherein the bending die has two or more recesses, and the bending knife has two or more protrusions corresponding to the two or more recesses of the bending die.

* * * * *